United States Patent [19]
Last et al.

[11] 3,888,106
[45] June 10, 1975

[54] TESTING APPARATUS FOR FLOW MEASURING DEVICES

[75] Inventors: Bernard Last; Eugene M. Weinberger, both of Uniontown; James R. Gray, Farmington; George W. Clements, Uniontown; Ralph E. Deffenbaugh, Uniontown, all of Pa.

[73] Assignee: Rockwell International Corporation, Pittsburgh, Pa.

[22] Filed: Mar. 7, 1973

[21] Appl. No.: 338,651

[52] U.S. Cl. ................................................ 73/3
[51] Int. Cl. ........................................ G01f 25/00
[58] Field of Search ........................................ 73/3

[56] References Cited
UNITED STATES PATENTS

| 3,177,699 | 4/1965 | Lindquist et al. | 73/3 |
| 3,517,308 | 6/1970 | Mirdadian | 73/3 |
| 3,631,709 | 1/1972 | Smith et al. | 73/3 |
| 3,711,689 | 1/1973 | Park | 73/3 |

Primary Examiner—Donald O. Woodiel

[57] ABSTRACT

Apparatus for determining whether fluid flow measuring devices are capable of measuring flow with acceptable accuracy. Provision is made for circulating a fluid through the flow measuring device and for generating signals indicative of whether the device being tested measured the flow with acceptable accuracy.

17 Claims, 15 Drawing Figures

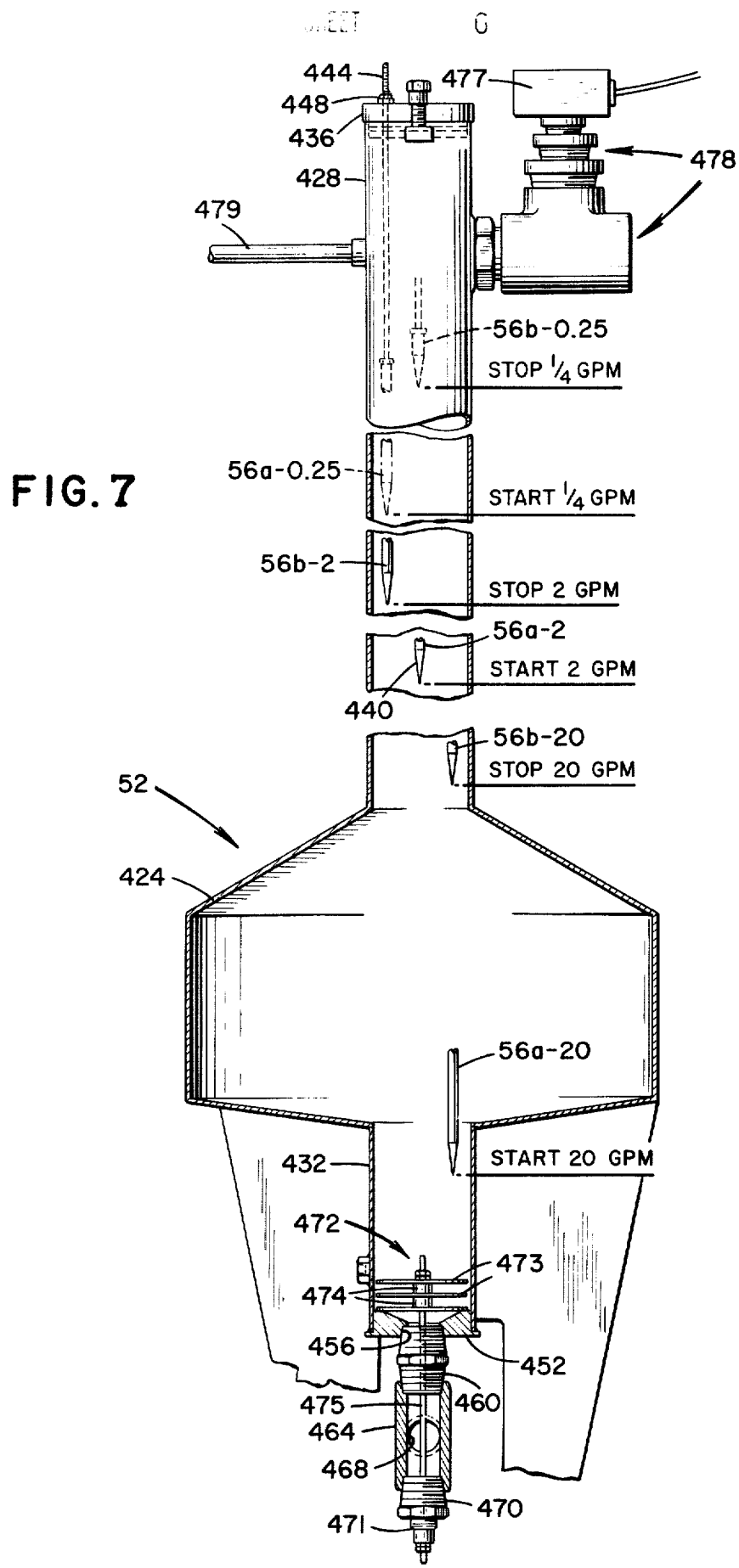

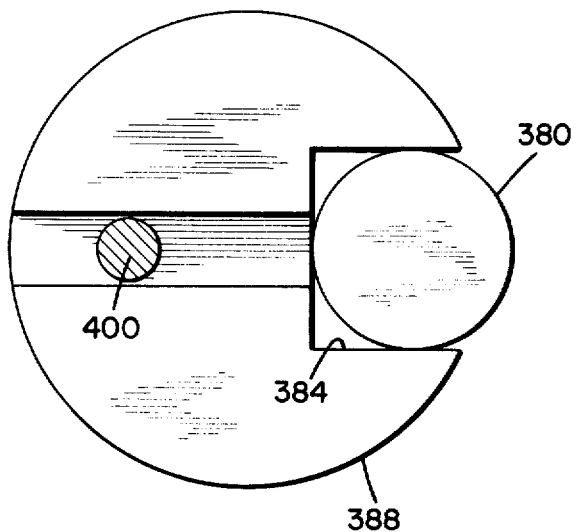
FIG. 9
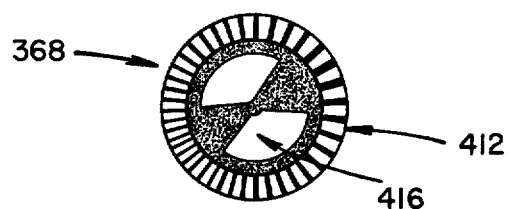
FIG. 10
FIG. 15
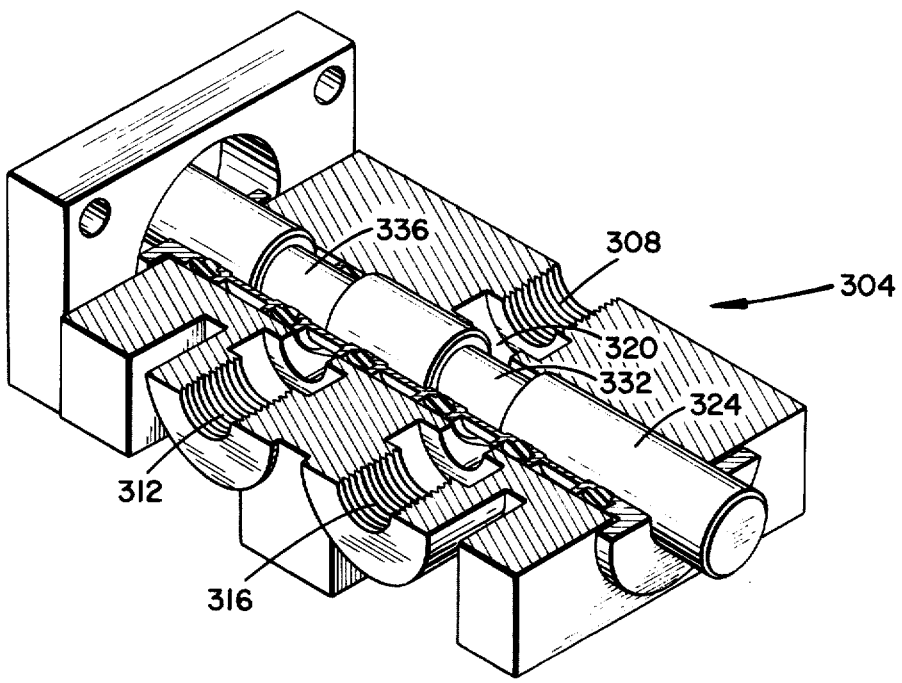

TESTING APPARATUS FOR FLOW MEASURING DEVICES

This invention relates to testing apparatus and, more specifically, to novel apparatus for determining whether the accuracy of fluid flow measuring devices is within acceptable limits.

In the past, the checking of fluid flow meters for accuracy has been essentially a manual task although one arrangement for accomplishing this mechanically has at least been proposed (see U.S. Pat. No. 3,631,709 issued Jan. 4, 1972).

Manual testing is slow and, also, introduces the possibility of human error into the manufacturing process. Furthermore, such testing typically involves weighing the test fluid displaced through the device being checked. This further lengthens the testing process and introduces a lack of precision into the testing procedure.

The testing apparatus disclosed in the patent mentioned above could conceivably eliminate the human error factor. However, this apparatus has a number of drawbacks, particularly in the manner in which the test fluid is caused to flow through the measuring devices being checked and in the arrangement employed to ascertain the flow which the devices being tested actually measure. Other disadvantages include the lack of any provision for making a permanent record of the test results and a number of mechanical drawbacks. For example, the measuring devices being tested must be manually raised from the locations where they are loaded into the apparatus to the locations where they are tested and then manually lowered to the original positions after the tests are completed so they can be unloaded.

We have now invented certain novel and improved apparatus for ascertaining the accuracy of fluid flow measuring devices which is free of the drawbacks of and otherwise has advantages over both manual testing procedures and the only apparatus known by us to have been proposed for accomplishing such testing mechanically; viz., that disclosed in the patent identified above.

Briefly, the novel apparatus of the present invention includes a test stand into which a number of the measuring devices to be checked can be rapidly loaded by an operator. The operator then pushes a "start" button; and the apparatus automatically, and without further attention, elevates the measuring devices, couples them into and flushes a liquid circulation system, ascertains the accuracy of the flow measuring devices at different rates of flow, displays and stores the results, returns the flow measuring devices to their original positions so they can be unloaded by the operator, and resets the system components to ready the apparatus for a subsequent cycle of operation.

The human factor is entirely eliminated from the operating sequence just described as it is carried out automatically from the time the flow measuring devices are loaded into the apparatus and the "start" button pushed to initiate the cycle.

The novel apparatus we have invented generates a series of pulses as the test fluid flows through each of the flow measuring devices being tested. Each pulse is indicative of the displacement of the same volume of fluid through a flow measuring device. A known volume of fluid is displaced through a flow measuring device in the course of a test. Consequently, the total number of pulses which is generated during the test is indicative of the total flow as actually measured by the device. The number of pulses which is actually generated is compared with the number which would be generated if the meter were 100 percent accurate, the result being a measure of the capability of the device for accurately measuring fluid flow.

This mode of operation of course requires that provision be made for precisely governing or determining the volume of liquid which is actually displaced through the flow measuring devices during the test. In our invention this is accomplished by a novel calibrated tank in which the test fluid is accumulated after it has passed through the devices being tested.

Mounted in the calibrated tank are uniquely sensitive probes which are employed to initiate a count of the flow indicative pulses at the start of each test and to terminate the count when precisely the desired volume of liquid has passed through the devices being tested.

Because of the novel arrangement just described, our testing apparatus is capable of insuring with a high degree of precision that the correct volume of test liquid has passed through the flow measuring device and that the period over which the flow indicative pulses are counted is precisely coextensive with that during which the selected volume of test liquid flows through the meter.

Another important advantage of the arrangement just described is that, because of their unique construction, the test liquid can not accumulate on the probes. This is important because accumulated liquid would form drops on the lower ends of the probes, and these would change the level in the calibrated tank at which the mechanism for recording the number of volume indicative pulses is activated and deactivated. Thus, we insure that the test will be repeated with precisely the same parameters in each succeeding operating cycle of the testing apparatus.

It is almost, if not entirely, universally required that the accuracy of fluid flow meters be checked at a number of different flow rates which typically vary as much as two orders of magnitude. Another important feature of our testing apparatus is a novel arrangement by which the tests at the different flow rates are automatically and successively carried out on the flow registering devices in the course of each operating cycle of our novel testing apparatus and for separately reporting the results of each of the different tests. The same provision is made in the apparatus described in the above-identified U.S. Pat. No. 3,631,709. However, the arrangement we employ is considerably different from that described in the patent and has a number of advantages not possessed by the latter.

For example, in the patented apparatus, different flow rates are produced by changing the speed at which the piston of a hydraulic cylinder is moved through the cylinder barrel. The patent points out that this requires that the flow be stabilized each time the flow rate is changed.

In contrast, the corresponding systems in our novel apparatus employ a constant speed circulating pump and a pair of electrically actuated valves to change the flow rate for successive tests. This arrangement permits "on-the-fly" testing, and virtually no interval between successive tests is needed to eliminate transients resulting from the change in the flow rate or to otherwise insure that the flow rate is stable at the beginning of each successive test.

Also, in our novel apparatus we employ in the calibrated tank discussed above a pair of probes as described previously for activating and deactivating a separate pulse accumulator for each flow measuring device being tested at each of the different flow rates. The tank is dimensioned and the probes so located that precisely the volume selected as appropriate to each flow rate test is displaced through each flow measuring device during each test. Thus, our novel apparatus has the advantages discussed above at any of the flow rates at which it may be employed to test flow measuring devices.

Yet another important feature of the invention is a novel pick-up assembly employed at each station to generate the pulses indicative of the flow through the measuring unit being tested there.

One significant characteristic of this unit is that it generates a greater number of pulses per cycle of movement of the metering component or components in the device being tested during the lower flow rate tests where only a small number of cycles may be made during the test while a conventional pulser as employed in the apparatus of U.S. Pat. No. 3,631,709 produces the same number of pulses per cycle at all flow rates. Our novel unit therefore has a significantly higher resolution at lower flow rates than the one just mentioned. As even a small fraction of a cycle may be a significant portion of the total displacement of the metering component during a low flow rate test, the output from our novel pulse generator much more accurately reflects the flow as measured by the device being tested than the type of pulse generator used in the patented apparatus.

In many flow measuring devices, the volume of fluid displaced by the metering component per unit increment of its movement changes throughout its cycle of movement. In testing such measuring devices our novel pick-up assemblies are significantly more accurate than those described above because the pulses are generated in such a manner that each pulse represents the displacement through the device being tested of the same volume of fluid despite the non-linear relationship between the displacement of the metering component and the flow of fluid through the meter.

Still other important features of the present invention are novel arrangements for controlling the sequence of functions in the test cycle, for converting the pulses generated in the pick-up assemblies to outputs indicative of the accuracy of the devices tested, for displaying and preserving the results of the tests, and for keeping the operator posted on the progress of the test cycle. Another important feature is that our novel testing apparatus can be constructed to accept different types of flow measuring devices for testing as well as devices which are of the same type but of different capacity.

From the foregoing, it will be apparent that one important and primary object of the present invention resides in the provision of novel, improved apparatuses for ascertaining the accuracy of fluid flow measuring devices.

Other important objects of the invention reside in the provision of apparatuses in accord with the preceding object:

1. which are capable of carrying out a sequence of test and other steps automatically and without further attention from an operator once the test sequence is initiated.
2. which significantly reduce the possibility of human error effecting the test.
3. in which the accuracy of the flow measuring devices can be ascertained with a high degree of precision at any of several different fluid flow rates.
4. which, in conjunction with the preceding object, are capable of operating with a significantly higher degree of precision at low flow rates than the equipment heretofore available for measuring the accuracy of fluid flow measuring devices.
5. which are capable of more precisely ascertaining the accuracy of that type of flow measuring device in which the volume displaced by the metering mechanism per unit increment of movement changes during the cycle of movement.
6. which are capable of testing flow measuring devices at different flow rates with only a minimal interruption between the successive tests.
7. which have a high degree of repeatability from test-to-test.
8. which have a novel and improved system for controlling the performance of the various functions in the operating cycle of the test apparatus.
9. which have novel systems for displaying and preserving the results of the tests.
10. in which provision is made for keeping an observer posted on the progress of the operating cycle.
11. which are capable of simultaneously testing a number of fluid flow measuring devices.
12. which can be employed with appropriate modifications to test fluid flow measuring devices of widely divergent character and/or those of different capacity.
13. which have various combinations of the features and attributes identified above.

Other important objects and advantages and further novel features of the present invention will become apparent from the appended claims and as the ensuing detailed description and discussion proceeds in conjunction with the accompanying drawing, in which:

FIG. 7 is a partially sectioned view of a system employed in the test stand to effect the displacement of precisely measured volumes of liquid through the flow measuring devices being tested;

FIG. 9 is a plan view of a crank member employed in the pulse generator;

FIG. 10 is a plan view of a counter disc employed in the pulse generator;

FIG. 15 is a section through one of two generally identical flow rate controlling valves employed in the testing apparatus of FIG. 2.

Figure 1:
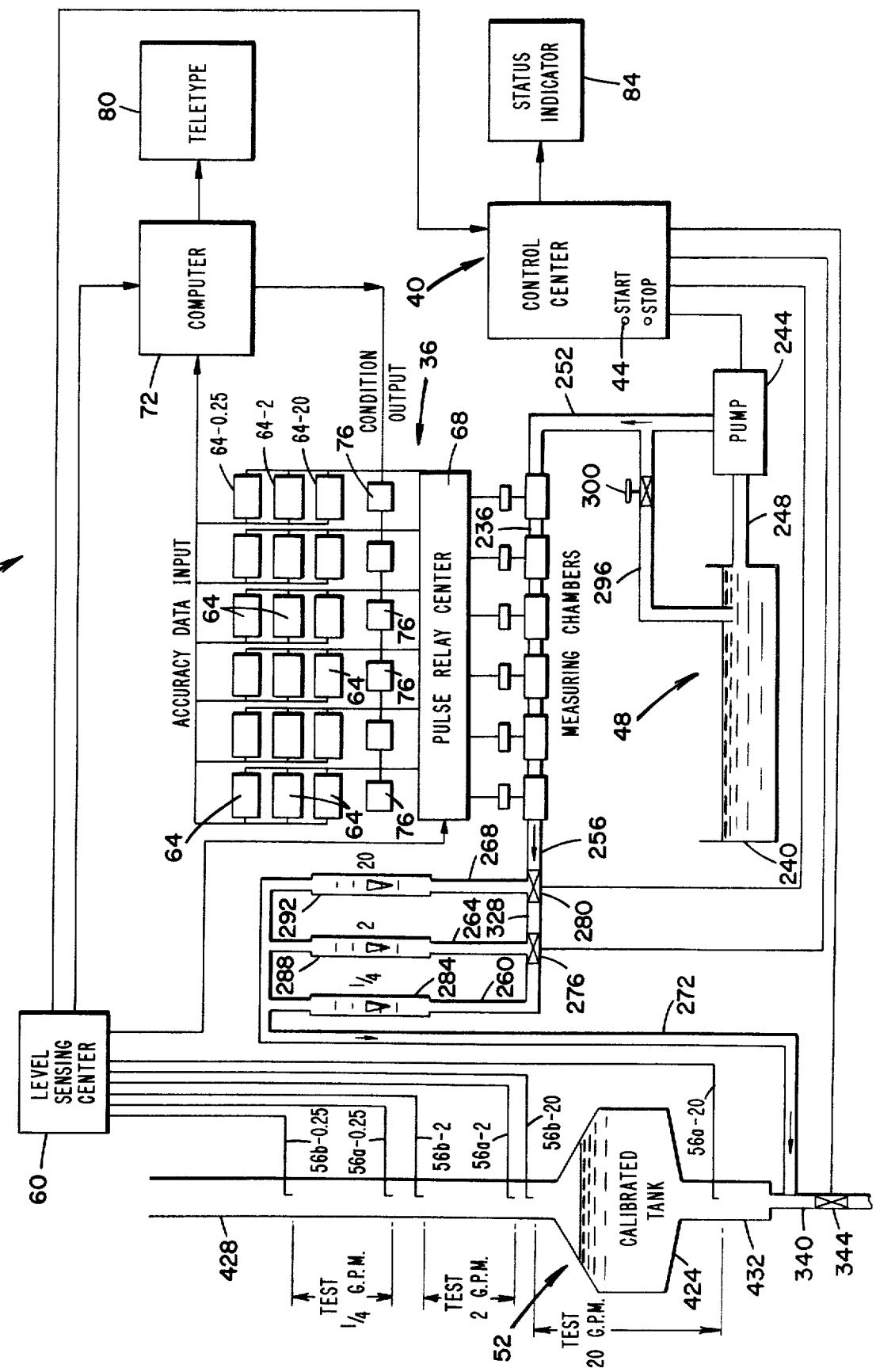
FIG. 1 is a schematic illustration of a system for ascertaining the accuracy of fluid flow measuring devices, the system embodying and being constructed in accord with the principles of the present invention.

Referring now to the drawing, FIG. 1 depicts in diagrammatic form testing apparatus 32 for ascertaining the accuracy of flow measuring devices. This apparatus embodies and is constructed in accord with the principles of the present invention.

The particular testing apparatus shown in the drawing was designed specifically to measure the accuracy of fluid flow meters of the type illustrated in U.S. Pat. No. 2,857,763, issued Oct. 28, 1958, to Hague et al for FLUID METERS. This type of meter employs a fluid flow metering assembly of the oscillating piston type. Liquid flowing through the flow measuring device displaces the piston through a closed path and then exits from the meter. As the metering component oscillates, a driver magnet movable with it effects the rotation of a co-operating, driven magnet, which drives the input of a conventional register. Thus, the advance of the register is proportional to the displacement of the metering component; and, as the latter is in turn proportional to the fluid displaced through the meter, the register output is indicative of the fluid which has flowed through the meter.

The accuracy of the metering assembly employed in a meter as disclosed in the Hague patent is essentially independent of the casing into which it is assembled. Consequently, it is only necessary to test the metering assembly rather than the assembled meter. As this is more easily done, testing apparatus 32 is designed to accept the flow measuring assemblies for testing rather than the assembled meters.

Referring again to FIG. 1, the major components of meter testing system 32 include a test stand 36 in which the metering devices to be checked can be loaded for testing. Six measuring devices are simultaneously checked in the illustrated stand 36. This number may, however, be varied as desired.

Another major component of the testing apparatus is a control center 40, which automatically cycles the testing apparatus through a test cycle initiated by depressing a "start" switch 44.

Also important in the successful operation of the testing apparatus is a system 48 for displacing a selected volume of test fluid through the flow measuring devices being checked at each of several different flow rates and for collecting the test liquid after it passes through the flow measuring devices.

The test liquid is collected in a calibrated tank 52 in which cooperating pairs of probes 56a and 56b are disposed. As the liquid level in the tank rises from the lower probe in each pair to the higher, an accurately known volume of liquid collects in the tank.

The probes are inputs to a level sensing center 60 which controls the operation of a series of pulse accumulators or counters 64 through a pulse relay center 68 in such a manner that a different accumulator is activated for each device being tested at each different flow rate test.

The counters accumulate and total pulses indicative of the flow through the devices being tested as actually measured by them. This information is transmitted to a computer 72 which stores the information and also ascertains whether each of the flow measuring devices performs with acceptable accuracy in each of the different flow rate tests to which it is subjected. The results are transmitted to a display unit 76 associated with each test station to indicate whether the meter there being tested has passed or failed each flow rate test.

The computer will also typically be coupled to a teletype or other printout device 80 so that a printed record of the test can be obtained at specified intervals or upon demand.

The final major component of the testing system 32 shown in FIG. 1 is a status indicator 84 which is also operated by control center 40. The status indicator displays to observers the step in the operating cycle of the apparatus which is being performed at any given time.

The systems described briefly above will typically be housed in the test stand 36 with the exception of computer 72 and printout unit 80.

Figure 2:
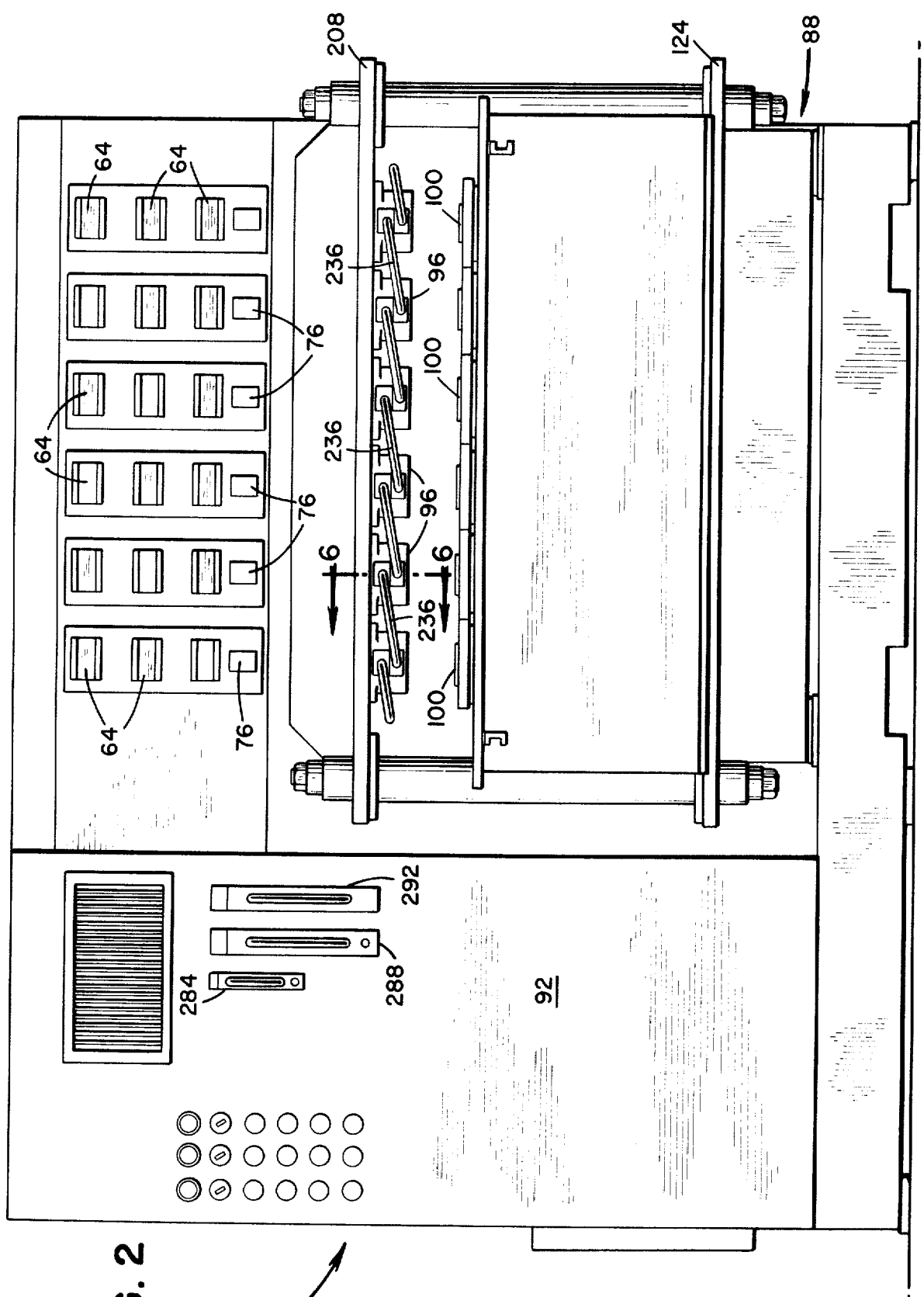
FIG. 2 is a front elevation of a test stand employed in the apparatus of FIG. 1.
Figure 3:
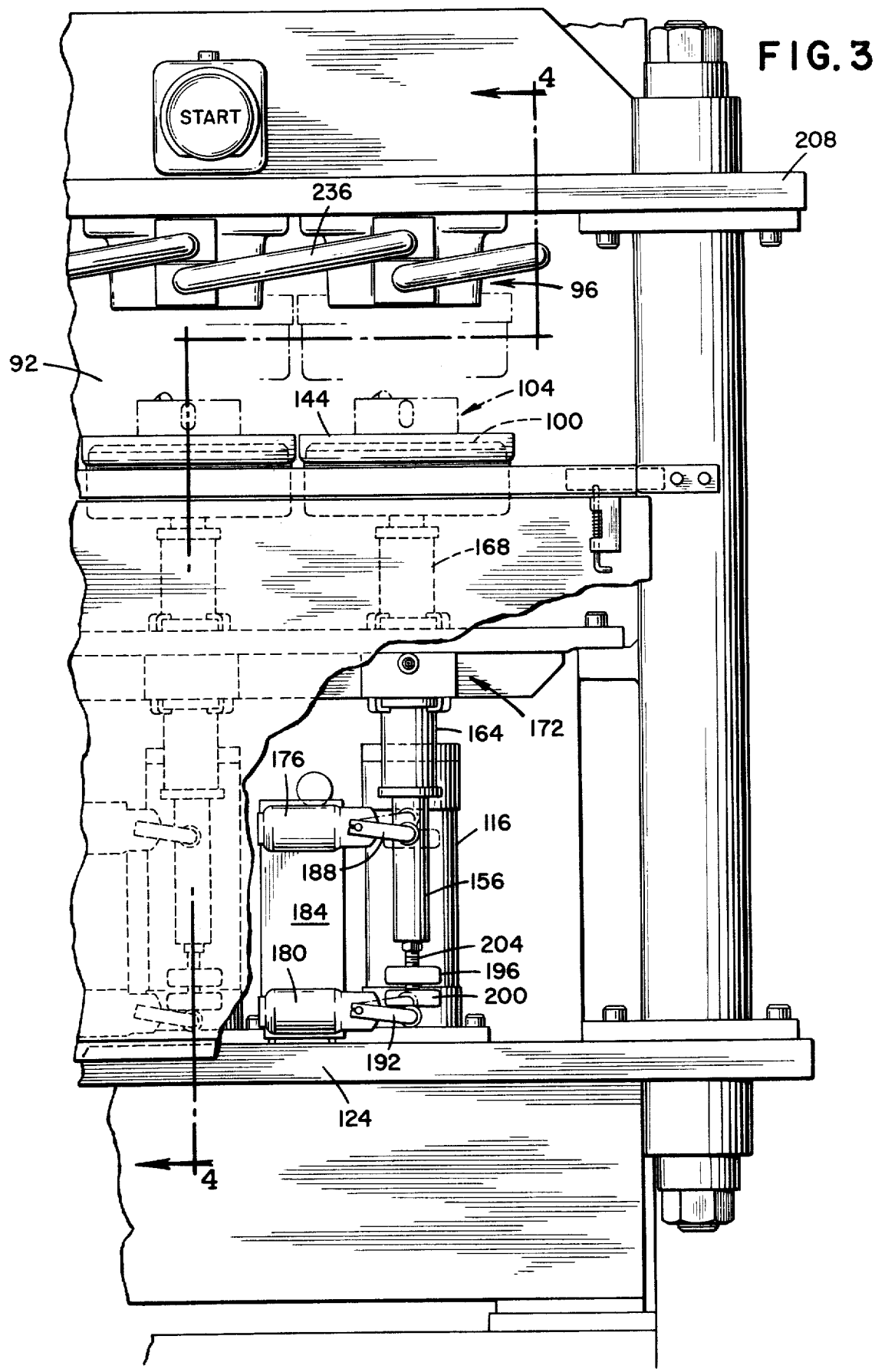
FIG. 3 is a fragment of FIG. 2 to an enlarged scale with part of the test stand casing being broken away to show certain of its internal components.
Figure 4:
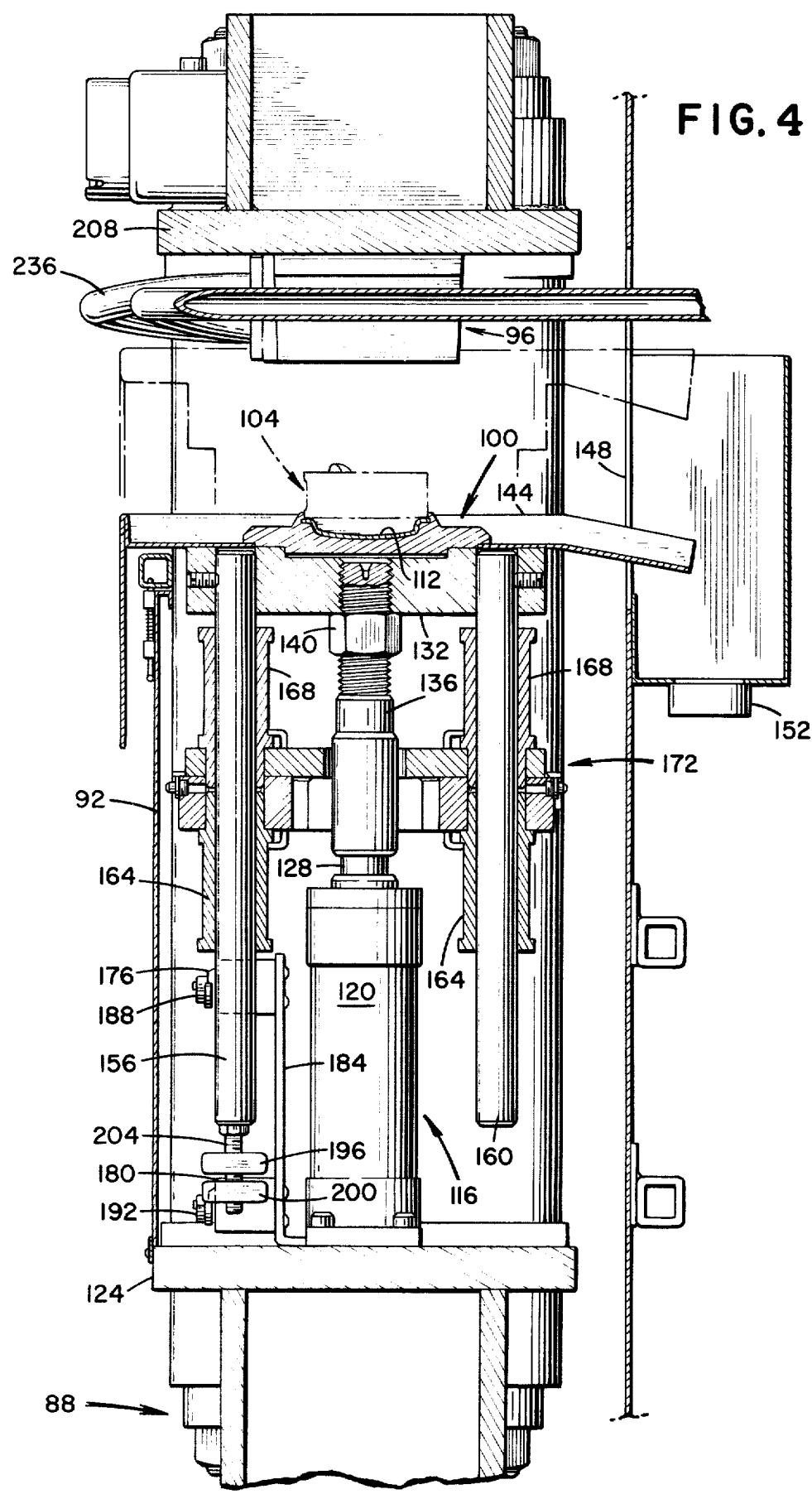
FIG. 4 is a fragmentary side view of the test stand.

As shown in FIGS. 2–4, test stand 36 includes a structural framework identified generally by reference character 88 surrounded by a similarly identified casing 92. The details of the framework and casing are not significant as far as the present invention is concerned and will, accordingly, not be described herein.

Supported from framework 88 at each of six locations are a stationary test fixture 96 and a movable support or test fixture 100 for the flow measuring devices being tested. In this case the flow measuring devices are metering mechanisms of the character described above and identified by reference character 104 in FIGS. 3 and 4.

Figure 5:
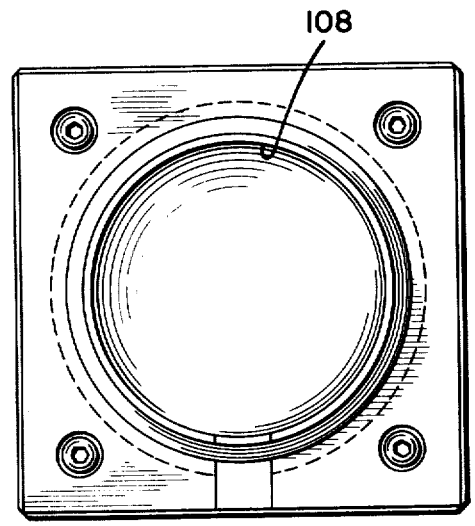
FIG. 5 is a plan view of a meter assembly support employed in the test stand.

As shown in FIGS. 3–5, the movable test fixtures 100 are generally block-like members, each having an upwardly opening cavity 108 configured to match the lower portion of flow measuring devices 104. A liner 112 in the cavity keeps test liquid from leaking through the joint between the flow measuring device 104 and the fixture 100 in which it is seated.

Test fixtures 100 are shown in their loading locations or positions in FIGS. 2–4. In the first step of the operating cycle of testing apparatus 32, the movable test fixtures are elevated to a test position shown in dotted lines in FIGS. 3 and 4 by a hydraulic cylinder 116. At the end of the cycle, the hydraulic cylinder lower the test fixtures and flow measuring devices to the full-line positions so that the flow measuring devices can be easily unloaded from the testing apparatus.

The barrels 120 of the hydraulic cylinders are fixed in a vertical orientation to structural member 124 of framework 88 with the piston rods 128 of the cylinders extending from the upper ends of the barrels.

Each test fixture 100 is supported from the piston rod 128 of the associated hydraulic cylinder by a support 132 in which the fixture is seated and by a piston rod extension 136. The latter component is threaded into support 132 and onto the piston rod 128. A nut 140 tightened to the bottom side of the support 132 keeps the piston rod extension from rotating relative to it.

Also mounted on each support 132 and surrounding the associated test fixture 100 is a tray 144. A small quantity of test liquid will remain in fixtures 96 and the associated components of test liquid supply system 48 at the end of the test sequence. As the test fixtures and flow measuring devices are restored to the positions where they are loaded into and unloaded from the apparatus, this liquid will drain from fixtures 96 into trays 144 and flow from the latter into a tank 148 provided with a drain 152.

To insure that flow measuring devices 104 are moved in a precise path and engage properly in stationary test fixtures 96 as the flow measuring devices are elevated, front and rear guides 156 and 160 are attached to the associated test fixture support 132 and extended downward through co-operating, stationary, tubular guides 164 and 168. Guides 164 and 168 are attached to those members of the testing apparatus structural framework identified by reference character 172.

The system for operating hydraulic cylinders 116 is not shown because it is generally conventional and because its details are of no consequent as far as the present invention is concerned. This system will, typically, include the usual reservoir, pump, hydraulic lines for circulating the fluid to opposite ends of barrels 120, and solenoid valves for directing the fluid under pressure to the appropriate ends of the hydraulic cylinders and permitting it to drain from the opposite ends back to the reservoir.

At each station, the solenoid valves are operated to stop the fixture 100 in its upper or test position by a switch 176 and in its lower or loading position by a switch 180. Both switches are supported by a bracket 184 from structural number 124. The switch actuators 188 and 192 are positioned for engagement by co-operating upper and lower actuators 196 and 200 threaded on an extension 204 depending from the lower end of front guide 156.

As each test fixture 100 is moved from the loading to the test position, the upper actuator 196 moves to the position shown in dotted lines in FIG. 3 and operates switch 176 at each station, the limit switch 176 closing when fixture 100 and test fixture 96 are properly mated to seal and properly position the device being tested. The switches 176 are in series with each other, and all must be closed to conduct the electrical signal necessary to begin testing. The hydraulic force remains applied to keep the fixture in mating, sealing engagement against the test liquid pressure.

When the direction of travel is reversed to return the test fixtures to the loading positions, lower actuator 200 operates the actuator of switch 180, altering the flow of hydraulic fluid to cylinder 116 to keep the fixture in the loading position. Actuators 196 and 200 can be threaded along extension 204 to precisely establish the upper and lower positions in which fixture 100 will be halted.

Figure 6:
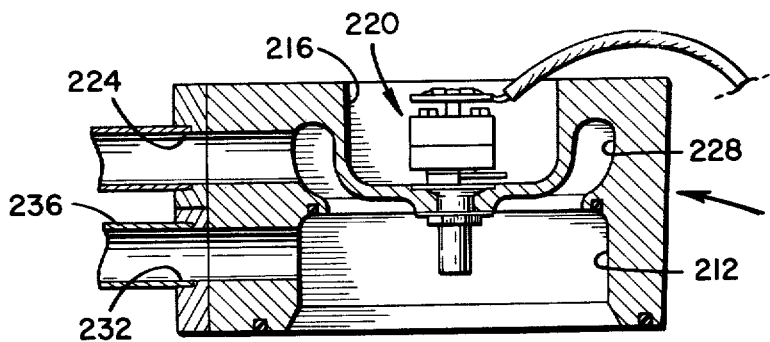
FIG. 6 is a section through the test stand taken substantially along line 6—6 of FIG. 2.

Referring now particularly to FIGS. 2-4 and 6, the stationary test fixtures 96 with which the flow registering devices 104 coact when test fixtures 100 are displaced to their test positions are supported from those structural framework components of the testing apparatus identified generally by reference character 208. As best shown in FIG. 6, each stationary test fixture includes a lower cavity 212 into which the flow registering device extends and an upper cavity 216 housing a pulse generating unit 220. The test liquid enters the fixture through an inlet 224, flows through a passage 228 in the fixture and through the flow measuring device being tested, and exits from the fixture through an outlet 232.

The six test fixtures 96 are connected in series by lines 236, which conduct the test fluid from the outlet 232 of one test fixture to the inlet 224 of the succeeding fixture. The first or right-hand fixture is supplied with the test liquid by system 48, and the test liquid flowing from the outlet 236 of the last or left-hand fixture 96 flows through other components of system 48 into calibrated tank 52.

As indicated briefly above, it is a function of fluid supply system 48 to effect a flow of the test fluid through the flow registering devices being tested at each of a number of different rates while maintaining the rate-of-flow constant during each of the different flow tests. This system includes: a reservoir 240 for the test fluid; a pump 244 which pumps the fluid from reservoir 240 through conduits 248 and 252 to the inlet 224 of the right-hand stationary test fixture 96; a conduit 256 from which the test fluid flows from the outlet 232 of the last, left-hand test fixture 96 through one of three parallel conduits 260, 264, and 268 and conduit 272 into calibrated tank 52; valves 276 and 280 which control the rate-of-flow of the test fluid through the measuring devices being tested; and flow raters 284, 288, and 292 which provides a visual indication of the rate at which the test fluid is flowing.

System 48 also includes a bypass arrangement including a bypass conduit 296 and a pressure responsive valve 300 for keeping the pump discharge pressure constant. Pressure responsive valve 300 is set at the selected discharge pressure, for example 100 psi. If the discharge pressure rises above the selected value, valve 300 will open and allow enough of the test fluid to flow back into reservoir 240 through conduit 296 to keep the discharge pressure at the selected value. This insures that the rate-of-flow of the test fluid through the flow measuring devices will remain constant at each of the different flow rates, and that the pump output will stay constant, preventing heat build-up in the pump.

Referring now to FIG. 15, the two rate-of-flow establishing valves 276 and 280 may be essentially identical. Each includes a housing or casing 304 with an inlet 308, two outlets 312 and 316, and a passage 320 housing a valve member 324. Inlet 308 can be connected to one of the outlets 312 or 316 through passage 320, depending upon the position of valve member 324. Each of the valves is also provided with conventional solenoid actuators (not shown). Valve member 324 is retained in a centered position in passage 320 by centering springs (not shown). In this position inlet 308 is blocked, and no fluid flows through the valve. The solenoids shift the valve member to the right or left to connect inlet 308 with a selected outlet. Upon deenergization of the solenoids, the springs return valve member 324 to the centered position.

Referring now to both FIGS. 1 and 15, the outlet 316 of valve 280 is connected to branch conduit 268; and outlet 312 is connected through a conduit 328 to the inlet 308 of valve 276. The outlets 312 and 316 of the latter are connected to conduits 260 and 264, respectively.

With the solenoid of valve 280 positioning valve member 324 as shown in FIG. 15, the test liquid discharged from the flow measuring devices being tested flows at a high rate (typically 20 gal./min.) into valve inlet 308, through passage 320 around a reduced diameter section 332 of the valve, and out outlet 316 into line 268 to calibrated tank 52.

To shift to an intermediate rate of flow (typically 2 gal./min.), valve 276 is operated to position its valve member 324 as shown in FIG. 15; and valve 280 is operated to shift its valve member 324 to the right. This interrupts the communication between inlet 308 and outlet 316, but permits the liquid to flow from passage 320 around the reduced diameter section 336 of the valve member into outlet 312. From the outlet, the liquid flows into the inlet 308 of valve 276 through passage 320 and outlet 316 and is discharged into the conduit 264 leading to tank 52.

For low flow (typically 0.25 gal/min) the valve members 324 of both valves are shifted to the right. Accordingly, the liquid flows through the path just described to inlet 308 of valve 276, through the valve, and out its outlet 312 into conduit 260 to the calibrated tank.

One of the important advantages of the novel technique for providing different flow rates just described is its simplicity. Another advantage, mentioned briefly above, is the rapidity with which the rate-of-flow stabilizes. Accordingly, only the briefest of periods need be provided between the tests at the different flow rates.

Before the first of the three flow rate tests for which the system illustrated in FIG. 1 is designed is initiated, the liquid flow system 48 is flushed to eliminate air from it. This is accomplished by pumping liquid through the flow measuring device and conduits 268 and 272 at the high rate-of-flow into a drain conduit 340, which communicates with the bottom of calibrated tank 52. A valve 344 in the drain conduit is kept open during this period. At the end of the flush, which is controlled by a conventional timer (not shown) in control center 40, valve 344 is closed; and the level of the test liquid in the tank begins to rise.

During the entire time that liquid is flowing through the flow measuring devices being checked, flow indicative pulses are generated by the pulse generators 220 housed in the stationary test fixtures 96 at the six stations. Initially, these pulses are not counted.

However, when the liquid reaches the lower end of lowermost probe 56a–20, a circuit is completed through the liquid between the probe and tank 52. This generates a signal in level sensing center 60 which is transmitted to pulse relay center 68. Upon receipt of this signal, the pulse relay center commands the counters 64–20 for the high rate-of-flow test at the six stations to begin accumulating the pulses generated by the associated units 220.

The level of the test liquid in tank 52 continues to rise until the liquid reaches probe 56b–20, completing a circuit which signals the end of the high rate-of-flow test. The level sensing center sends this signal to the pulse relay center 68, and the latter blocks the entry of further pulses into the high rate-of-flow test counters 64–20.

Typically, the testing apparatus will be designed so that a perfectly accurate device will cause the associated unit 220 to generate one thousand pulses during the test just described. Thus, the number of pulses actually generated can with the addition of a decimal point be converted to a number which is the accuracy of the flow measuring device in the form of a percentage. Accordingly, the pulse count in the form displayed by the associated counter 64–20 will indicate not only whether the device tested at each station was accurate, but if inaccurate, by how much and whether the error was on the high or low side.

At the end of the high rate-of-flow test, the level sensing center also sends a signal to computer 72 which causes the pulse counts accumulated in the six counters 64–20 to be transmitted to the computer.

A customer will typically specify the deviation from complete accuracy which a flow measuring device can have and still be acceptable. This may be, for example, ± 0.4 percent. These requirements are stored in the computer and the count data transmitted from each station at the completion of the test and compared with them. This generates an indication of whether the device being tested at each station performed with an acceptable degree of accuracy. The computer then transmits to the display unit 76 at each station signals which will cause that unit to identify the test which was performed and whether the measuring device being tested at that station passed or failed the test. An observer can use the information so displayed to identify those flow measuring devices which should be scrapped or reworked and can also record the information manually to make a permanent record if desired.

At the end of the high rate-of-flow test, the level sensing center transmits still another completion-of-test signal to control center 40. In response, the control center operates valves 276 and 280 in the manner described above to decrease the rate-of-flow of the test liquid through the flow measuring devices to an intermediate (typically 2 gal./min.) rate.

The intermediate flow rate test then proceeds, beginning with the arrival of the test liquid at the lower end of probe 56a–2 and terminating when the liquid reaches the lower end of probe 56b–2. The low rate-of-flow test follows.

The operation of testing apparatus 32 is essentially the same in each of the intermediate and low flow rate tests as in the high rate-of-flow test. As successive ones of the four remaining probes 56 are reached, circuits completed through the test liquid result in the generation of signals in level sensing center 60 which, transmitted to computer 72 and to control center 40, produce the same sequence of events as described in conjunction with the high flow rate test and also change the rate of flow of the test liquid through system 48 between the intermediate and low flow rates in the manner discussed above.

In the low and intermediate flow rate tests the flow indicative pulses generated at the six test stations by the pulse generating units 220 are accumulated in counters 64–2 and 64–0.25, respectively; and the computer output signals light the 2 and ¼ displays rather than the 20 display in signaling whether the flow measuring device at each station passed or failed the intermediate and low flow rate tests.

In addition to initiating those operations performed at the ends of the high and intermediate rate-of-flow tests, the signal generated in level sensing center 60 will typically be utilized at the end of the low flow rate test to instruct computer 72 to print out on unit 80 the results of the three tests conducted at each of the six stations in the test cycle. Also, upon receipt of the signal generated upon the completion of the low rate-of-flow test, control center 40 will allow valves 276 and 280 to return to a centered position to terminate the flow of test liquid through system 48 and actuate hydraulic cylinders 116 to lower test fixtures 100 and the flow measuring devices mounted in them to the loading/unloading positions shown in FIGS. 2–4. The control center will, in addition, cause valve 344 to open, allowing the collected test liquid to drain from calibrated tank 52.

However, the units 76 and the three pulse accumulating counters 64 displaying the results of the test at each station will remain lit until start button 44 is pushed to initiate a subsequent test cycle.

For the most part, the details of the components involved in the test sequence just described are not critical as far as the present invention is concerned. In fact, they will vary to a considerable extent from installation-to-installation, depending upon the particular type and number of flow measuring devices being tested, the number and specific character of the tests to be performed, etc.

Included in this category are control center 40, level sensing center 60, pulse relay center 68, computer 72, counters 64, and display units 76 as well as the flow raters 284–292 by which an observer can check that the rate-of-flow through the device is maintained within acceptable limits.

Figure 8:
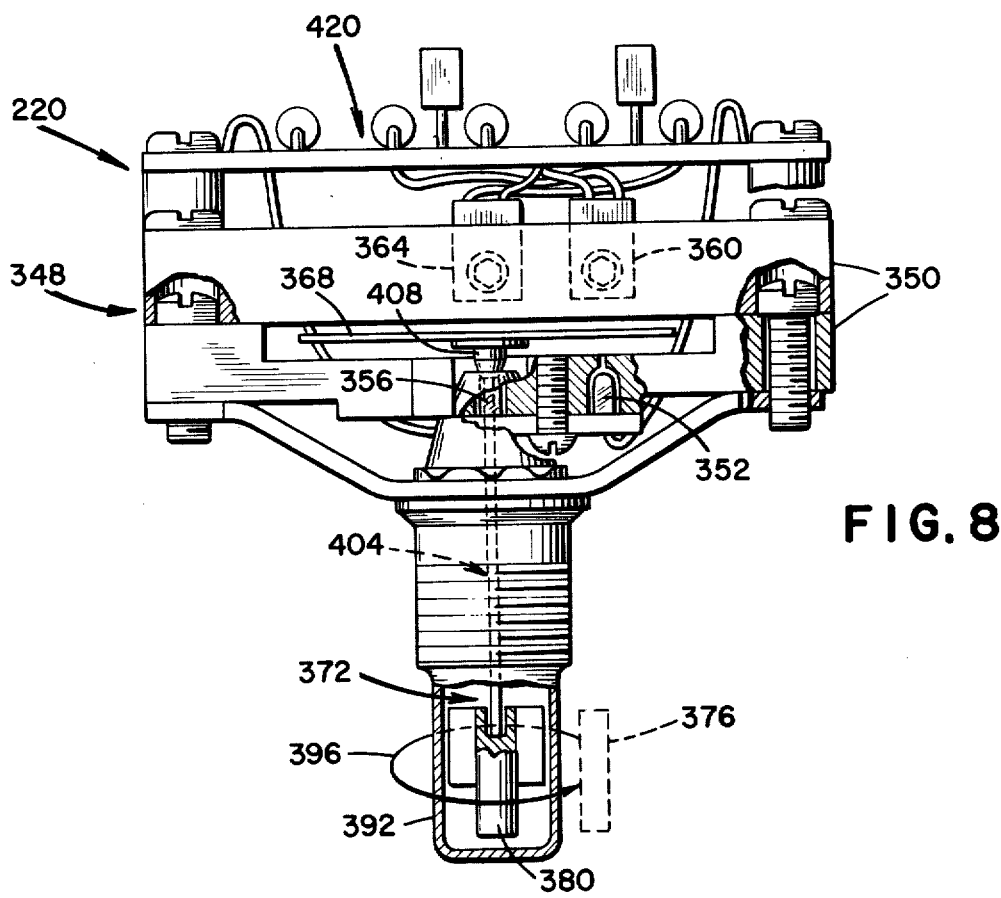
FIG. 8 is a partially sectioned view of a pick-up assembly or pulse generator employed in the test stand.

Referring now specifically to FIG. 8, however, the pulse generating units 220 at the six stations are unique and play a considerable role in the successful operation of testing apparatus 32.

Each of the pulse generating units 220 includes a casing 350 housing light sources 352 and 356 and associated electrical signal generating transducers 360 and 364, a counter disc 368, and a drive arrangement 372 which rotates the counter disc and is driven by the metering mechanism in the flow registering device being tested.

More specifically, as discussed above, the pulsating piston type flow measuring device which the exemplary testing apparatus disclosed herein was specifically designed to check includes a driver magnet. As the piston is displaced through a closed path, this magnet drives a follower magnet, rotating a shaft drive-connected to a rotary register input to advance the register. In the novel testing apparatus of the present invention, the driver magnet (shown diagrammatically in FIG. 8 and identified by reference character 376) similarly rotates a follower magnet 380 in the pulse generating unit (see FIG. 9) to operate the latter.

The follower magnet is confined in a recess 384 in a crank member 388 housed in a magnet well 392 fastened to the lower side of casing 350 (see also FIG. 9). As the test liquid flows through the measuring device being tested, driver magnet 376 moves around well 392 in a circular path as indicated by arrow 396 in FIG. 8. This causes follower magnet 380 to describe a similar path in magnet well 392, rotating crank member 388 about its vertical axis.

Fixed to crank member 388 opposite the follower is an eccentric 400 formed on the lower end of a vertically extending shaft 404. The upper end of this shaft supports a hub 408 to which the counter disc 368 mentioned previously is attached in any suitable manner. Accordingly, the counter disc is rotated as follower magnet 380 is driven by driver magnet 376.

Referring to FIGS. 8 and 10, two sets of light transmitting windows 412 and 416 are formed on counter disc 368, there being two inner windows 416 in the illustrated exemplary counter disc and 40 windows in the outer set.

As the counter disc 368 rotates, the two windows 416 alternately move into alignment with light source 356 and transducer 364. Each time this occurs, the transducer generates a pulse, which is amplified in an amplifier 420 fixed to casing 350 and transmitted to pulse relay center 68. Throughout the high rate-of-flow test, the pulse relay center allows these pulses into the appropriate counters 64–20. In the intermediate and low rate-of-flow tests and while fluid is flowing through the flow measuring devices but no tests are being conducted, however, the pulses generated by the coaction of light source 356, transducer 364, and counter disc windows 416 are blocked from entry into any of the counters at the station where the unit 220 in which they are generated is located.

Referring still to FIGS. 8 and 10, the second set of windows 412 on disc 368 result in pulses also being generated by transducer 360 as the counter disc revolves, one pulse being generated as each window 412 passes between the transducer and the associated light source 352. During the high rate-of-flow test and while test fluid is flowing through the device being checked but no tests are being conducted, the pulse relay center blocks these pulses from the high flow rate test counters 64–20.

During the intermediate and low flow rate tests which the apparatus is also designed to carry out, the pulse relay center transmits pulses generated by transducer 360 to intermediate and low flow rate counters 64–2 and 64–0.25, respectively. Here, the pulses are accumulated to produce indications of the capabilities of the flow measuring device being tested at low and intermediate flow rates.

To understand why two sets of pulses are generated in each of the pulse generating units 220 employed, it must be appreciated that smaller volumes of test fluid are employed in the intermediate and low rate-of-flow tests so that they can be completed in reasonable periods of time. Accordingly, the total displacement of the metering component of the flow measuring devices is much less in these tests; and the counter disc consequently makes few revolutions.

For example, in the exemplary embodiment of the invention disclosed herein, counter disc 368 make only 25 revolutions in the low and intermediate flow rate tests as opposed to the above-mentioned 500 in the high flow rate test.

As only two pulses per revolution of the counter disc are generated by windows 416, a considerable error could be introduced if the pulses generated by transducer 364 were employed is ascertaining the results of the low and intermediate flow rate test. The counter disc could rotate almost 25 complete revolutions with only 49 pulses being generated. This would result in an almost two percent error being indicated even if the flow measuring device were perfectly accurate.

Such errors are avoided in the low and intermediate flow rate tests because not two but 40 pulses are generated and transmitted to the appropriate counters during each operating cycle of the flow measuring device being tested at each station. Accordingly, as in the high flow rate test, an absolutely accurate flow measuring device will generate 1000 pulses during the course of the low and intermediate flow rate tests; and the largest error which could be introduced by a fractional revolution of a counter disc would be negligible.

While advantageous at lower flow rates because they provide greater resolution, the larger number of transparent windows 412 would be disadvantageous for a high flow rate test. In the latter, any error attributable to a fractional revolution of counter disc 368 is limited to much less than 0.1 percent making the generation of more than two pulses per revolution of the counter disc unnecessary. If 40 pulses per revolution of the counter disc were generated at the high speed at which the counter disc revolves in the high flow rate test, more expensive counters would have to be employed to count the pulses; and additional circuitry would have to be used to guard against the generation of spurious pulses, all without any useful improvement in the performance of the testing apparatus.

Referring again to FIG. 10, it will be noted that windows 412 are distributed in a circular pattern around counter disc in a regular, but non-uniform pattern. This, again, is a significant feature of the invention. Specifically, the oscillating piston of a flow measuring device as described above operates in a non-linear manner. The distances through which the piston is displaced by equal increments of fluid flowing through the measuring device varies in a calculatable manner during the cycle of movement of the piston. Accordingly, there is a corresponding variation in the angular velocity of the counter disc 368 of each pulse generating unit 220 as it revolves.

The non-linear spacing of windows 412 compensates for this non-uniformity so that the pulses generated by a transducer 360 are all indicative of the passage through a flow measuring device of the same volume of test liquid.

Referring now specifically to FIG. 7, another important feature of the present invention involved in the test sequence just described is the calibrated tank 52 and the three sets of level detecting probes 56a and b-20 56a and b-2, and 56a and b-0.25 associated therewith.

As shown in the Figure just mentioned tank 52 has an enlarged diameter section 424 between upper and lower sections 428 and 432 of a smaller diameter. In the exemplary embodiment of the invention to which the drawings are devoted intermediate section 424 is 18 inches in diameter; and the diameter of upper and lower sections 428 and 432 is 4 inches.

Fitted in the upper end of tank 52 is a top cap 436 from which the level detecting probes 56a and b are suspended, the probes being equally spaced around the top cap.

The probes are elongated conductive rods typically having a diameter of 0.25 inch and formed from a material such as stainless steel. In the exemplary embodiment of the invention disclosed herein the probes range in length from 2 to over 47 inches.

As shown in FIG. 7, the probes have tapered lowered ends 140. The included angle of this taper is preferably 12° ±1° with an 0.005 −0 + 0.003 inch radius at the point. These dimensions are not arbitrary, but are of signal importance to the successful operation of testing apparatus 32. They insure that an electrical circuit as discussed above will be instantaneously completed when the spherical lower end of a tapered point 440 is contacted by the test liquid. Also, these dimensions insure that drops of liquid will not form on the ends of the probes when the test liquid is drained from the tank at the end of a test. As discussed above, this insures repeatability in the operation of testing apparatus 32 from test-to-test.

Referring again to FIG. 7, the six test probes 56 are suspended from top cap 436 by elongated rods 444 which are threaded into the upper ends of the probes and extend upwardly through the top cap. Rods 444 can be adjusted vertically by threading nuts 448 along them. This permits test tank 52 to be calibrated so that precisely the desired volume of liquid will be collected in tank 52 between the lower end of the probe 56a and the lower end of the probe 56b in each set of tests.

To obtain accurate results, relatively rapid rises in the level of the collected liquid must be obtainable from fairly small quantities of liquid. This dictates that the test liquid be collected in a receptacle of relatively small cross-sectional area. At the same time, from a practical point-of-view, there are limitations on the height of receptacle which can be employed.

The novel configuration of tank 52 discussed above as well as the situating of the six probes 56 in it as shown in FIG. 7 achieves both these goals. Specifically, the four probes 56a and b-0.25 and 56a and b-2 associated with the lower and intermediate flow rate tests are all located in the small diameter, upper section 428 of tank 52. The level of the test fluid rises rapidly in this section as the liquid flows into it during the low and intermediate flow rate tests.

At the same time, the volume of fluid employed in these two tests is relatively small and can be collected in a section of not undue length. For example, in the exemplary, illustrated embodiment of the invention, the liquid level rises only some 23 inches from the beginning of the intermediate flow rate test to the end of the low flow rate test.

In the high rate-of-flow test, the bulk of the test liquid is collected in the large diameter section 424 of tank 52. Height is no problem because of the large diameter of intermediate tank section 424. For example, in the illustrated tank, the distance the liquid level rises in the course of the high flow rate test is only 14.75 inches. Despite this, fast response times are not sacrificed because the lower ends of the probes which signal the beginning and completion of this test are located in the small diameter tank sections 428 and 432 in which the rapid level changes are obtained.

Referring again to FIG. 7, the lower end of tank 52 is closed by a bottom end cap 452. Fixed in a central bore 456 of the end cap is a nipple 460 to which a tee 464 is attached. This fitting has an outlet 468 to which drain conduit 340 (see FIG. 1) is connected.

Supported from tee 464 is a plug 470 having a fitting 471 connected thereto. Fitting 471 supports a diffuser assembly 472 consisting of a series of perforated plates 473 separated by spacers 474 and mounted on a rod 475. This diffuser assembly assures that the rising water surface will be level and turbulence-free.

An overflow switch 477 is connected to the interior of tank 52 above the lower end of the uppermost probe through a series of fittings identified in toto by reference character 478. If the control system malfunctions and the liquid rises above the lower end of probe 56b-0.25, the liquid will reach switch 477 through fittings 478; and the switch will interrupt the continuity in the pump circuit (not shown) to shut off pump 244.

Also associated with tank 52 is a sight glass 479. This is provided so an observer can follow the rise of the test liquid in the calibrated tank.

The final system involved in the operating sequence described above deemed to warrant comment is the status indicator 84 provided so an observer may determine which function in the operating cycle of testing apparatus 32 is in progress. Typically, the indicator will consist of nothing more than a series of lamps accompanied by appropriate legends identifying the various functions performed in the operating cycle. These lamps are lit and extinguished at appropriate times by signals emanating from control center 40 as indicated in FIG. 1.

The novel testing apparatus just described is versatile, and its operation can be varied to best meet the exigencies of a particular application. For example, it is not necessary that computer 72 be programmed to print out the test results at the end of the operating cycle. Instead, or in addition, for example, it can be programmed to print out test results upon demand. Also, as will be obvious to those skilled in relevant arts, it can also be programmed to calculate and make various types of statistical information available at selected intervals and upon demand.

It is by no means even necessary that a computer be employed in controlling the operation of testing apparatus constructed in accordance with the principles of the present invention or in ascertaining whether the flow measuring devices being tested perform with acceptable accuracy and displaying the test results.

An alternate system for sequencing the testing apparatus through the various functions described above is shown in block diagram form in FIG. 11. FIG. 12 illustrates in similar fashion an alternate system for evaluating the performance of the flow measuring devices in each test and displaying the results.

Figure 11:
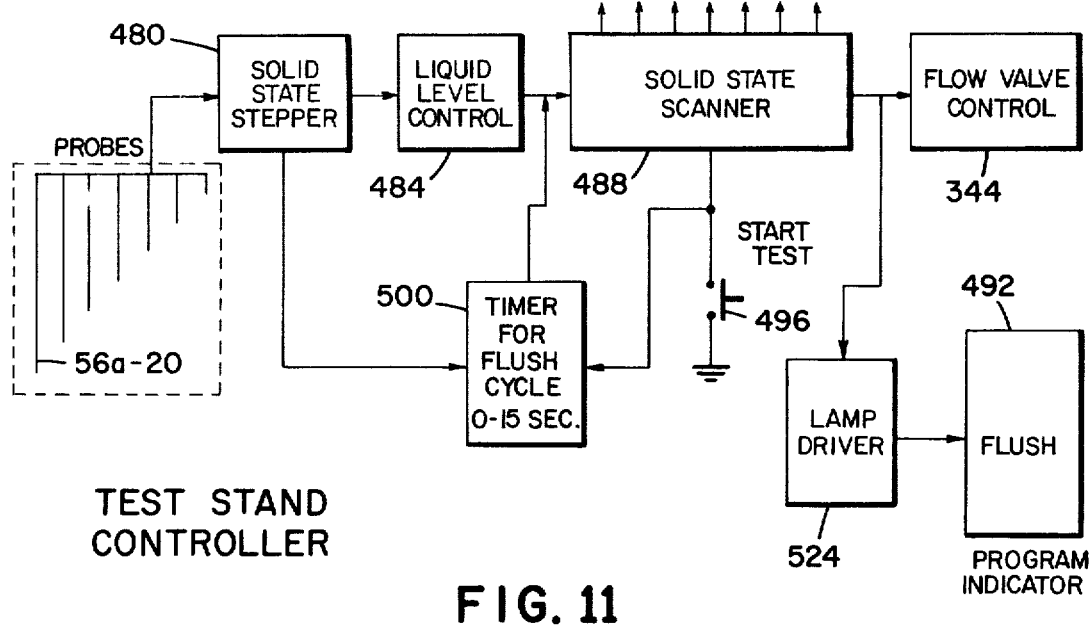
FIG. 11 is a schematic of an alternate system for controlling the operation of testing apparatus embodying the principles of the present invention.
Figure 12:
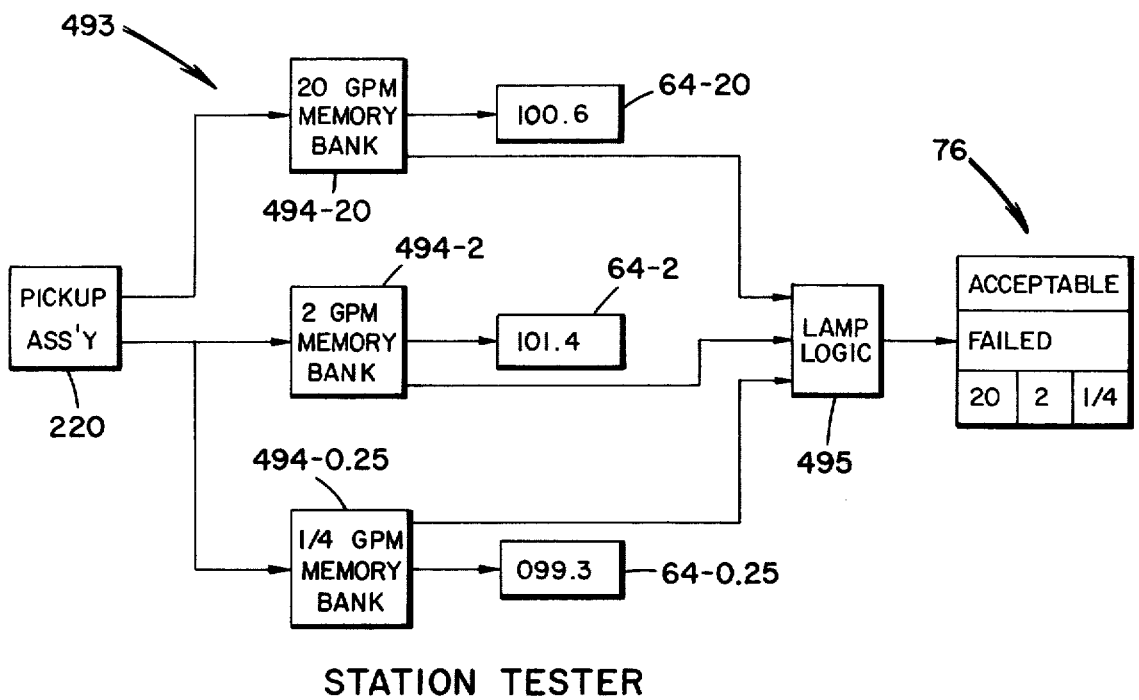
FIG. 12 is a schematic of a system employed in conjunction with that illustrated in FIG. 11 to provide an indication of whether a tested metering component is capable of measuring fluid flow with an acceptable degree of accuracy.

Referring now specifically to FIG. 11, the control system therein illustrated replaces the level sensing center 60, computer 72, control center 40, pulse relay center 68, and status indicator 84 illustrated in FIG. 1. The control system includes a solid state stepper 480, a level control 484, a scanner 488, and a program indicator 492.

Also, a system 493 for ascertaining the performance of a flow measuring device being tested is employed at each of the test stations in this embodiment of the invention. Each such system includes a memory bank or unit 494 for each of the flow tests and a lamp logic unit 495 together with a pulse generating unit 220, three display counters 64, and a display unit 76, all as described previously.

The operation of the testing apparatus is essentially the same under the control of the system shown in FIG. 11 as it is under the control of the FIG. 1 system. Specifically, depression of a start button 496 activates a flush cycle timer 500. Also, this produces a signal which clears counters 64 and visual display units 76 and actuates the hydraulic cylinders 116 to close test fixtures 96. As the test fixtures reach their closed positions, the associated limit switches close. After all limit switches close, a circuit is completed to initiate the flush cycle so that air will be flushed from the system in the manner described above.

At the end of the flush cycle, timer 500 transmits a flush completion signal to scanner 488. Upon receipt of this signal, the scanner causes drain valve 344 to close; and the level of the liquid in calibrated tank 52 accordingly begins to rise.

From this point, the high, intermediate, and low flow rate tests proceed in turn under the control of probes 56, solid state stepper 480, and liquid level control 484. The probes function in the manner described previously in signaling the beginning and completion of each test.

When the level of the liquid collected in calibrated tank 52 reaches the second probe 56b -20 and thereafter, circuit continuity is established between the tank and all of the probes contacted by the test liquid. Solid state stepper 480 is employed to insure that, in these circumstances, only the appropriate probe is connected in circuit with the control system power source (not shown).

Liquid level control 484 includes the circuitry for generating the signals indicative of the beginning and of the completion of the high, intermediate, and low flow rate tests as successive probes are contacted by the test liquid.

The details of stepper 480 and level control 484 are not critical in the successful operation of testing apparatus 32, and they are not part of the present invention. For these reasons and because those skilled in the relevant arts can readily call to mind a variety of components which can be employed for the purposes just described, they will not be described in detail herein.

Figure 13:
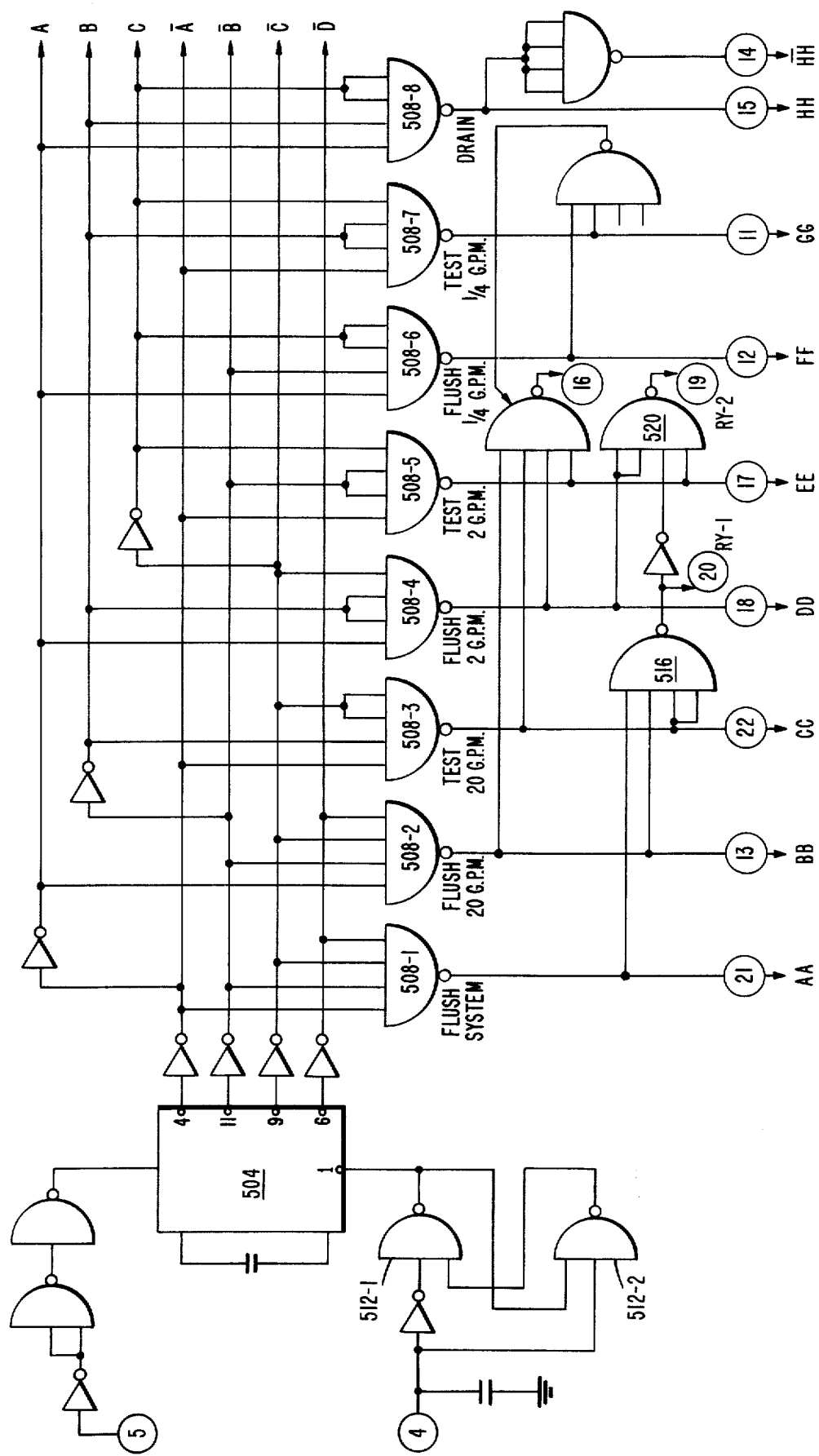
FIG. 13 is a logic diagram for a scanner employed in the system of FIG. 11.

Referring now to FIG. 13, which is a logic diagram for scanner 488, the depression of "start test" button 496 applies a pulse to scanner input pin 5. This resets decade counter 504.

The four BCD outputs (pins 4, 11, 9, and 6 of the decade counter) are connected to eight nand gates 508-1 - 508-8. The BCD outputs and their complements provide the nand gates with a logic table which will enable one gate for each function in the test sequence.

Initially, the "flush system" nand gate 508-1 is enabled, providing a flush command AA at pin 21. This command is utilized to initiate the flushing of air from system 48 in the manner described previously.

Following the period determined by timer 500, a flush completion signal from timer 500 is applied to scanner pin 4. The pulse is shaped by a network includes gates 512-1 and 512-2 and applied to pin 1 of decade counter 504. This pulse advances the counter one position, disabling the flush system nand gate and enabling the "flush 20 gpm" nand gate 508-2. This provides a command BB at pin 13. Command BB is utilized to close drain valve 344 and initiate the accumulation of test liquid in tank 52.

The probe sensing system controls the sequence from this point by applying to pin 4 pulses which advance counter 504 to step the testing apparatus through the sequence described previously.

Specifically, as the test liquid flows into tank 52 and contacts probe 56a-20, counter 504 is advanced, enabling nand gate 508-3; and a signal CC appears at terminal 22. This allows the pulses being generated by the pickup assembly 220 at each of the test stations to be accumulated in the associated memory bank 494-20 in a manner described in detail hereinafter.

The accumulation of pulses continues until the level of the liquid in tank 52 reaches probe 56b-20. At this point, counter 504 is advanced, nand gate 508-4 is enabled, and signal DD appears at terminal 18. This inhibits the memory unit 494-20 in the associated system 493, and no further pulses can be accumulated.

A gate 516 is also enabled at the same time as gate 508-4, and a second signal Ry-1 appears at scanner pin 20 as a consequence. This effects the shifting of valves 276 and 280 (described above) which decreases the flow of test liquid through system 48 to the intermediate rate.

The liquid in the tank continues to rise and the flow stabilizes at the intermediate rate. The liquid then contacts probe 56a-2, stepping counter 504 to enable nand gate 508-5; and signal EE appears at scanner pin 17. This allows the intermediate rate test memory banks 494-2 at the test stations to begin accumulating pulses.

As the liquid in the tank subsequently contacts probe 56b-2, counter 504 is advanced, enabling gate 508-6; and signal FF appears at terminal 12. This terminates the counting of pulses in the associated memory bank 494-2.

A gate 520 is enabled at the same time as gate 508-6, and signal Ry-2 appears at terminal 19. This causes valve 280 to remain in the configuration in which the test liquid can flow to valve 276 and the latter to be adjusted so that the test liquid will flow through it and conduit 260 at the low rate.

A flow rate stabilization period follows. During this test, liquid continues to rise in tank 52. Then probe 56a-0.25 is reached, advancing counter 504 to enable gate 508-7. This causes signal GG to appear at pin 11, which permits the accumulation of pulses in the memory bank 494-0.25 of the associated system 493, starting the low rate test.

The low rate test and the accumulation of pulses continue until the test liquid reaches probe 56b-0.25, which advances counter 504 and enables gate 508-8, signal $\overline{HH}$ and its complement HH appearing at scanner pins 15 and 14. A third signal appears at the same time at pin 16.

Signals HH and $\overline{HH}$ are utilized to terminate the accumulation of pulses in memory bank 494-0.25 to end the low rate test; to release valves 276 and 280 for return to their closed positions; and to activate display units 76, which display the results of the three tests at each station.

The signal at pin 16 results in the opening of valve 344, allowing the test liquid to drain from calibrated tank 52.

Here the scanner stops and awaits the start test command which initiates a new cycle.

In addition to sequencing the testing apparatus through the test cycle, scanner 488 controls lamp program indicator 492 through lamp driver 524, causing the indicator to display the function in the testing cycle which is being performed at any given time.

Indicator 492 may be of the same character as the indicator 84 described previously. And lamp driver 524 contains only straightforward logic circuitry and has no features which are critical as far as the present invention is concerned. Accordingly, the indicator and drive will not be described in detail herein.

As shown in FIG. 13, scanner 488 also has terminals where signals A-D and their complements appear. These are not used in the operating sequence described above. They can be employed, for example, to insure that the scanner is functioning properly.

The illustrated scanner can be readily modified in a straightforward manner to control the hydraulic cylinders 116 by which the movable test fixtures 100 are displaced from the positions in which the flow measuring devices are loaded into them to the test positions and then returned to the loading positions.

Figure 14:
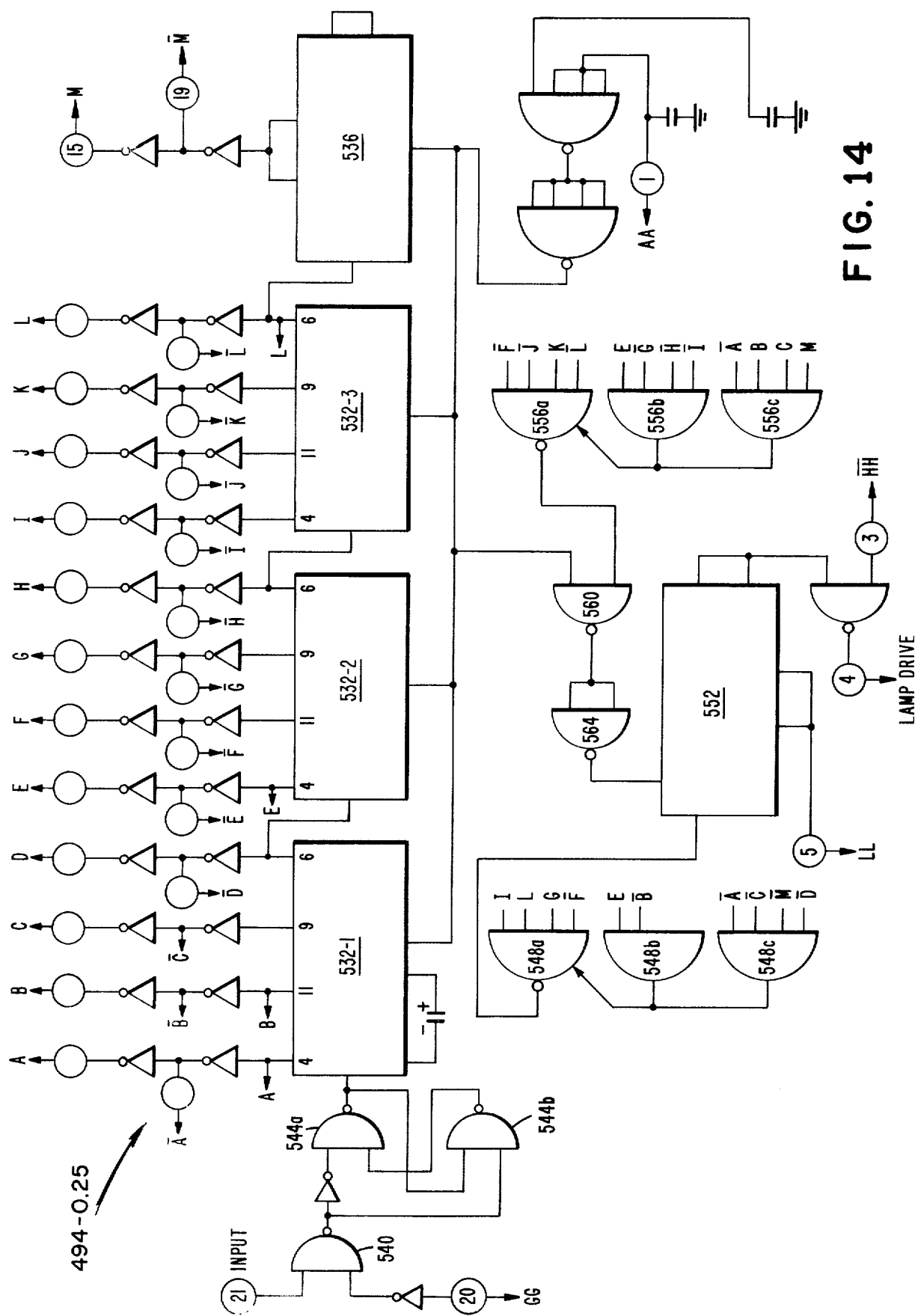
FIG. 14 is a logic diagram for one of several generally identical memory banks employed in the system of FIG. 12.

Referring now to FIGS. 12 and 14, all three previously mentioned memory units 494 in the performance measuring system 493 at each test operate in essentially the same fashion, differing only in particular, preset, high and low limits for determining whether the flow measuring devices pass or fail the test with which the particular memory unit is associated.

Referring now to FIG. 14, and taking any of the six identical memory unit 494-0.25 as an example, the reset pulse AA described above is applied to pin 1 of the memory unit in the initial step of the test cycle. This resets the three decade counters 532-1 - 532-3 and the flip-flop 536 in the memory bank to zero.

Input pulses from the pulse generator 220 at the test station are always present at pin 21 of the memory unit while liquid is flowing through the flow measuring device being tested there. However, these pulses are normally inhibited from entry into decade counters 532 by control gate 540.

When the intermediate flow rate test is completed, the flow through system 48 and the measuring devices stabilized at the low rate, and the level of the test liquid in tank 52 up to probe 56a-0.25 to initiate the low flow rate test, signal GG appears at the pin 11 of scanner 488 as described above.

This signal is applied to memory bank pin 20, opening control gate 540 and allowing the pulses from the associated pulse generating unit 220 to enter a pulse shaper network which includes gates 554-1 and 544-2. The pulses are then counted by the decade counters 532 with the least significant digit counter 532-1 filling first and counters 532-2 and 532-3 being filled in turn.

The total number of pulses counted in the low rate test in the exemplary embodiment of the invention referred to above can exceed 1000 with the measuring device within acceptable accuracy limits. The fourth significant digit is provided by triggering flip-flop 536 with pulse number 1000 so that a signal will appear at pin 15.

The three decade counters 532 have pins (see FIG. 14) at which signals A-L can appear during the course of the test. Signals appearing at these pins and at pin 15 (if 1000 or more pulses are accumulated) are applied to the display counter 64-0.25 associated with the memory bank.

At the end of the low rate test, signal HH is caused to appear at pin 15 of scanner 488 as discussed above. This signal is applied to pin 20 of memory unit 494-0.25 to inhibit the entry of pulses into decade counters 532.

At any point during the test, the counter will display the counts which have accumulated to that point. At the end of the test, it will display the total number of counts accumulated during the test. As indicated above, a decimal point will also typically be displayed between the two least significant digits in the display counter so that the accuracy of the meter in the form of a percentage can be read directly from the counter.

A second function of each memory unit is to determine whether the flow measuring device under test is acceptable or has failed.

A limit below which accuracy is not acceptable is provided by nand gates 548a - c. In a typical application of the invention this will be 950 pulses.

As the pulses accumulate in decade counters 532, signals appear at different ones of the counter output terminals as discussed above. These signals are applied to the nand gates, the logic of the gates being such that, if 950 pulses are accumulated in decade counters 532 during the low flow rate test, a pulse is gated through gates 548 to flip-flop 552.

This flip-flop is originally set in the fail condition. The low limit pulse triggers it to the acceptable condition.

A limit above which accuracy is not acceptable is provided by nand gates 556a - c. In the above-mentioned application of the invention this is 1016 pulses. If the number of pulses accumulated in decade counters 532 during the low flow test exceeds 1015, a pulse is gated through gates 556. This resets the flip-flop to the fail position.

Therefore, only if the device being tested performs within the preselected limits will the flip-flop be in the pass condition at the end of the test.

The flip-flops in the three units 494 at each test station drive the associated character display device 76 through lamp logic 495 by way of the signals (pass or fail) which appear at the pins 5 of the units at the completion of the tests with which they are associated. The lamp logic is so constructed that, if the device being tested performs within the preset limits in all three tests and the flip-flop is in the pass condition, the signals which appear at pins 5 will cause the "acceptable" display in device 76 to be illuminated. If the accuracy of the flow measuring device is outside the preset limits in one or more tests, the character of one or more signals at pins 5 will be altered; and the "failed" display will be lit at the end of the test sequence.

Also, if the measuring device fails a test, a signal will appear at the pin 4 of the memory unit associated with the test. The signal or signals appearing at these pins enable the appropriate flow rate displays at the end of the test sequence so that the test or tests which the flow measuring device failed can be visually ascertained.

The particular lamp logic which is employed is not critical, it only being necessary that the logic illuminate either the acceptable or failed display and the appropriate flow rate display or displays 20, or 2, or ¼ if one or more tests are failed. For this reason and because the lamp logic is entirely straightforward, it will not be described in detail herein.

As discussed above, the flip-flop 552 of each memory unit is reset to the failed condition by the application of command signal AA to pin 1 of the unit or by the gating of a pulse through nand gates 556 if the device being tested exceeds the high limit. The reset signal is transmitted by gate 560 to inverter 564 and the inverted signal applied to the flip-flop.

Testing apparatus for ascertaining the accuracy of flow measuring devices in accord with the principles of the present invention may of course assume many different forms without departing from these principles. Several alternatives have been suggested above. Many others will readily occur to those skilled in the relevant arts. For example, the movable and stationary test fixtures can be easily modified to accept complete metering devices instead of the flow measuring units for such meters. Also, if meters or metering components of different sizes are to be tested, the fixtures can be dimensioned to accept the larger flow measuring devices and provided with inserts to accomodate those of smaller size.

If metering components with different capacities are to be tested, the apparatus can also be provided with a plurality of calibrated fluid collecting tanks, each being calibrated for a different type of flow measuring device and the system being designed so that the tank appropriate for a given series of tests can be selectively coupled into flow system 48.

Another typical modification of the illustrated apparatus involves mounting the movable test fixtures on a single frame so that they can be simultaneously moved from the loading position to the test position and returned to the latter. Hydraulic cylinders may be employed to raise the frame, or lead screw or other types of systems may be employed for this purpose.

The apparatus disclosed herein is of course not limited to the testing of oscillating piston type metering devices. With only minor modifications it may be employed to test other types of positive displacement flow measuring devices, both linear and non-linear; turbine meters; etc. Many modifications of the character of those just described can also be made, depending upon the application to which the apparatus is to be put. Accordingly, the enumeration of specific alternatives is for illustrative purposes only and is not intended to limit the scope of protection to which applicants consider themselves entitled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for determining whether the accuracy of a flow measuring device is within acceptable limits, comprising a reservoir, means for pumping the test liquid from said reservoir through the flow measuring device being tested, means for collecting the fluid after it is displaced through the measuring device, means having an output indicative of the flow through the flow measuring device as measured by said device, means for comparing the measured flow with the volume of test fluid that is collected, a bypass from the discharge side of said pumping means to said reservoir and a pressure responsive valve in said bypass for maintaining the pressure on the discharge side of the pumping means constant, and means for changing the resistance to the flow of the test liquid on the downstream side of the flow measuring device to alter the rate-of-flow of the test fluid through the flow measuring device.

2. Apparatus for determining whether the accuracy of a flow measuring device is within acceptable limits, comprising: means for effecting a flow of a test liquid through said measuring device; means for collecting the fluid after it is displaced through the measuring device; means having an output indicative of the flow through the flow measuring device as measured by said device; means for comparing the measured flow with the volume of test fluid that is collected, and transport means automatically operable upon the initiation of a test cycle to move the measuring device from a loading station to a test station and to subsequently return the measuring device to the loading station for unloading from the apparatus at the end of the test cycle.

3. Apparatus for determining whether the accuracy of a flow measuring device is within acceptable limits, comprising: means for effecting a flow of a test liquid through said measuring device, means for collecting the fluid after it is displaced through the measuring device, means having an output indicative of the flow through the flow measuring device as measured by said device which includes means for generating a series of pulses each indicative that a given volume of fluid has flowed through the flow measuring device, and means making said pulse generating means operable concomitantly with the collection of the test liquid.

4. The apparatus of claim 3, wherein the means for collecting the test liquid is a receptacle and wherein the means having the output indicative of measured flow further comprises a counter for accumulating and totalling the pulses generated by said pulse generating means and control means including first and second fluid level detectors in said receptacle for enabling said counter to begin accumulating pulses as the collection of the test liquid is initiated and for halting the accumulation of pulses as the collection of test liquid is terminated.

5. The apparatus of claim 4, wherein said receptacle has a portion with a large cross-section within which a large volume of fluid can be collected and portions of smaller cross-section above and below the larger cross-section portion and wherein one of said level detectors is located in each of said receptacle portions of smaller cross-section, whereby a relatively large quantity of liquid can be collected in a portion of said receptacle which is vertically compact, but whereby the collection of test fluid can be started and stopped in parts of said receptacle in which the ratio of level change to volume is relatively large to thereby maximize the correspondence of the period during which the selected volume of fluid is collected and that in which the pulses are accumulated in the counter.

6. The apparatus of claim 4, wherein said level detectors are probes with depending tapered ends having an included angle on the order to $12° \pm 1°$, whereby test liquid will not accumulate on the ends of said probes and whereby said probes will be highly sensitive to changes in the level of test liquid in the receptacle.

7. The apparatus of claim 6, together with means for adjusting the positions of said probes vertically in said receptacle so that the desired volume of test liquid will be accumulated therein as the level of the test liquid in the receptacle rises from the lower end of one to the lower end of the other of said probes.

8. The apparatus of claim 6, together with means in said receptacle for minimizing turbulence in the test liquid which flows into the receptacle.

9. The apparatus of claim 3, wherein the means for comparing the measured flow with the volume of collected test liquid comprises means for comparing the number of pulses generated by said pulse generating means with the number of pulses which would be generated if the flow measuring device being tested were completely accurate.

10. The apparatus of claim 3, wherein said pulse generating means comprises a light source, means comprising a transducer opposite said light source for producing an electrical pulse in response to the impingement of light on said transducer, a member interposed between said light source and said transducer and having light transmitting portions at intervals therearound, means rotatably supporting said member, and means for drive-connecting said supporting means to the flow measuring device being tested for rotation by the metering means of said device whereby, as said metering means is displaced through its cycle of movement by the test fluid flowing therethrough, said member will be rotated to bring the light transmitting areas thereof into registration with the light source and transducer and effect the generation of pulses at a frequency indicative of the flow of the test fluid through the flow measuring device.

11. The apparatus of claim 10, wherein said pulse generating means includes a plurality of transducers as aforesaid and wherein the rotatable disc has a set of light transmitting areas as aforesaid aligned with each of said transducers, there being a different number of light transmitting areas in each of said sets, whereby said pulse generating means can be caused to generate different numbers of pulses per cycle of movement of the metering means in the flow registering device.

12. Apparatus for determining whether the accuracy of a flow measuring device is within acceptable limits, comprising: means for effecting a flow of a test liquid through said measuring device; means having an output indicative of the flow through the flow measuring device as measured by said device; and means for comparing the measured flow with the volume of test fluid actually displaced through the flow measuring device in the course of the test, the output indicative means including at least two pulse generators each capable of producing a different number of pulses per cycle of operation of the flow measuring device being tested and means for selectively activating one of the other of the pulse generators, whereby at low flow rates and slow cycling of the flow measuring device, the number of pulses generated per cycle of operation of the pulse generating means can be increased to thereby insure that there is no decrease in the degree of precision with which the accuracy of the device being tested can be ascertained at low flow rates.

13. The apparatus of claim 12, wherein said pulse generators each include a light source and means comprising a transducer opposite said light source for producing an electrical pulse in response to the impingement of light on said transducer, said pulse generators being incorporated in a unit which also includes a member interposed between said light source and said transducer and having light transmitting portions at intervals therearound alignable with each of the transducers in the unit; means rotatably supporting said member; and means for drive-connecting said supporting means to the flow measuring device being tested for rotation by the metering means of said device whereby, as said metering means is displaced through its cycle of movement by the test fluid flowing therethrough, said member will be rotated to bring the light transmitting areas thereof into registration with the light sources and transducers and effect the generation of pulses by each of the transducers at a frequency indicative of the flow of the test fluid through the flow measuring device.

14. Apparatus for determining whether the accuracy of a flow measuring device is within acceptable limits, comprising: means for effecting a flow of a test liquid through said measuring device, means having an output indicative of the flow through the flow measuring device as measured by said device, means for comparing the measured flow with the volume of test fluid displaced through the flow measuring device in the course of the test, and means on the downstream side of the flow measuring device which can be operated to change the rate-of-flow of the test fluid through the flow measuring device from one to another of a plurality of flow rates, said means for changing the rate-of-flow of test fluid through the flow measuring device including a plurality of serially connected, multiported valves.

15. Apparatus for determining whether the accuracy of a flow measuring device is within acceptable limits, comprising: means for effecting a flow of a test liquid through said measuring device; means having an output indicative of the flow through the flow measuring device as measured by said device; and means for comparing the measured flow with the volume of test fluid that is actually displaced through the flow measuring device in the course of the test, the means with the flow indicative output including means for generating a series of pulses each indicative of the displacement through the flow measuring device of a given volume of test fluid and said pulse generating means including means for making the pulses generated thereby each indicative of the displacement through the test device of the same volume of liquid despite changes in the volume of liquid displaced through the device per unit of movement of the metering means during its cycle of movement.

16. Apparatus for determining whether the accuracy of a flow measuring device is within acceptable limits, comprising: means for effecting a flow of a predetermined quantity of test liquid through said measuring device, means for collecting the fluid after it is displaced through the measuring device, means having an output indicative of the flow through the flow measuring device as measured by said device which includes means for generating a series of pulses indicative of the volume of fluid having flowed through the flow measuring device, and means making said pulse generating means operable concomitantly with the collection of the test liquid.

17. The apparatus of claim 16 in which as a result of the passage of said predetermined quantity of test liquid through said measuring device the number of pulses which would be produced by said pulse generating means if the flow measuring device being tested is completely accurate, is make up of even multiples of ten.

* * * * *